Oct. 6, 1925.  
A. KLOTZ  
VALVE  
Filed Dec. 11, 1924  
1,556,224
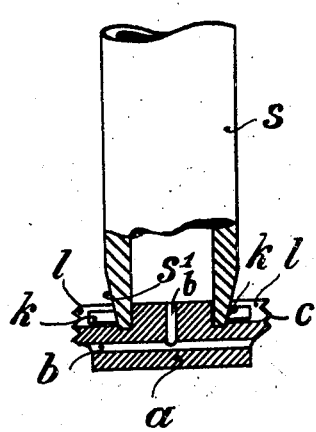
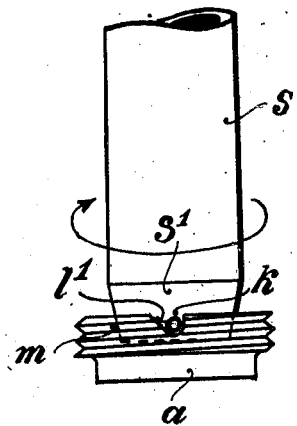
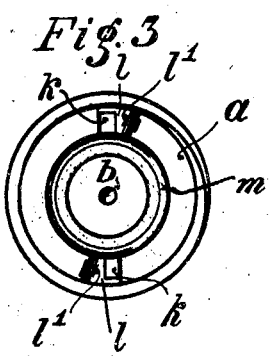
Inventor:
Alfred Klotz
by
Attorney Patented Oct. 6, 1925.

1,556,224

UNITED STATES PATENT OFFICE.

ALFRED KLOTZ, OF MUNICH, GERMANY.

VALVE.

Application filed December 11, 1924. Serial No. 755,150.

*To all whom it may concern:*

Be it known that I, ALFRED KLOTZ, citizen of Germany, residing at Munich, Germany, have invented certain new and useful Improvements in Valves, of which the following is a specification.

The present invention has reference to improvements in valves, and it relates more particularly to valves of that type in which the valve plug is rotatingly operated by an insertable tool, such as a socket wrench, and the object of the invention is to provide means whereby excess rotation of the plug, which is apt to strip the thread and injure the seating surfaces, is prevented by the tool automatically being disconnected from the plug upon the latter being properly seated.

My invention will best be understood when described in connection with the accompanying drawing, in which Fig. 1 is a vertical section, partly in elevation, through a valve plug with inserted wrench; Fig. 2 is an elevation thereof, turned through an angle of 90° from the position shown in Fig. 1, and Fig. 3 is a top view of the plug member.

In the embodiment shown by way of example the relatively flat valve plug $a$ is provided with air ducts $b$ and an outer thread $c$ with which it engages in a complemental inner thread in the valve case which latter is not shown here, as having no bearing on the invention. Such flat valves are in use for various purposes, for instance for inflatable bags of all kinds. Into the top face of the plug is sunk an annular depression or groove $m$, the outer circumferential face of which is conically tapered, and the lower end $s'$ of the tool $s$ is similarly tapered to cooperate therewith. The tool, for instance, may be the nozzle end of an air pump, which when inserted into the annular plug groove makes a tight joint with the plug without any special packing or screw or other means, and this nozzle, then, is used as wrench to operate the valve by rotation. The frictional contact between the taper surfaces is strong enough to cause the plug to be screwed home onto its seat, or to be unseated again, as the case may be. In the relatively small, flat valves of but a few threads used in air cushions and the like, it often happens that upon excess force being used at the end of the seating operation the thread is stripped and the valve ruined.

To prevent this I provide in the top face of the valve plug one or more radially directed grooves $l$ which merge into the annular groove $m$, and I provide at the lower end of the tool one or more radially extending pins $k$, adapted to engage in the plug groove or grooves $l$, as shown in the drawing. The leading edge $l^1$ of each plug groove $l$ slants outwardly and is rounded off (Fig. 2). The tool is so inserted into the plug groove $m$ that the pin or pins $k$ engage in the respective groove or grooves $l$, and the tool is then rotated in the direction of the arrow in Fig. 2, taking along the plug by friction until it is screwed home on its seat. Upon the tool still further being rotated, the pin or pins $k$ run up on the slanting groove edge $l^1$ and cause thereby the tool to be lifted out of operative contact with the plug.

Though I have shown two radial grooves $l$ and a like number of tool pins $k$, I have done this merely by way of example, and I may, obviously, use only one such groove and pin or more than two.

What I claim is:—

1. In a plug valve of the character set forth, operable by an independent, detachable tool, in which the relative displacement of the plug is caused solely by friction between it and the tool, means for preventing injury to the cooperating valve parts by excess operation of the plug, which comprise in combination with the valve plug which latter presents an annular top groove and at least one radially directed depression communicating with said top groove, a cam surface forming the leading edge of said radial depression slanting forwardly outwardly and adapted to cooperate with the detachable tool for causing the latter to ride out of operative contact with said plug upon the latter becoming properly seated.

2. In a plug valve of the character set forth, operable by an independent, detachable tool, in which the relative displacement of the plug is caused solely by friction between it and the tool, means for preventing injury to the cooperative valve parts by excess operation of the plug, which comprise in combination with a rotatable tapered air supply nozzle presenting radially extending pins, a rotatable valve plug having an annular top groove and radial depressions merging into said top groove, said annular groove having a taper complemental to that of said nozzle, and the leading edges of said radial depressions slanting forwardly to form cam surfaces for engagement by said nozzle pins for causing them to ascend them upon the nozzle continuing its forward operative rotation after the plug has already become properly seated.

ALFRED KLOTZ.